April 8, 1952 — E. VOGES — 2,591,894
INTERMITTENTLY ACTUATED DISTRIBUTOR DISPENSING VALVE
Filed June 10, 1949 — 2 SHEETS—SHEET 1

Inventor
Edwin Voges
By John N. Randolph
Attorney

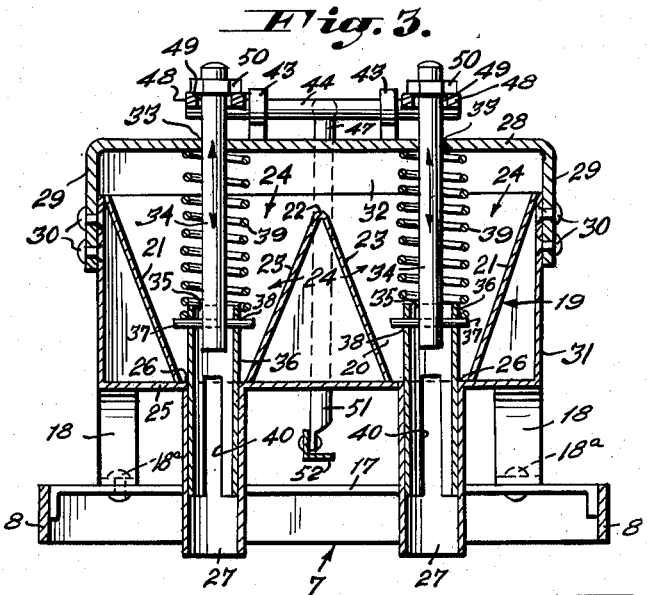
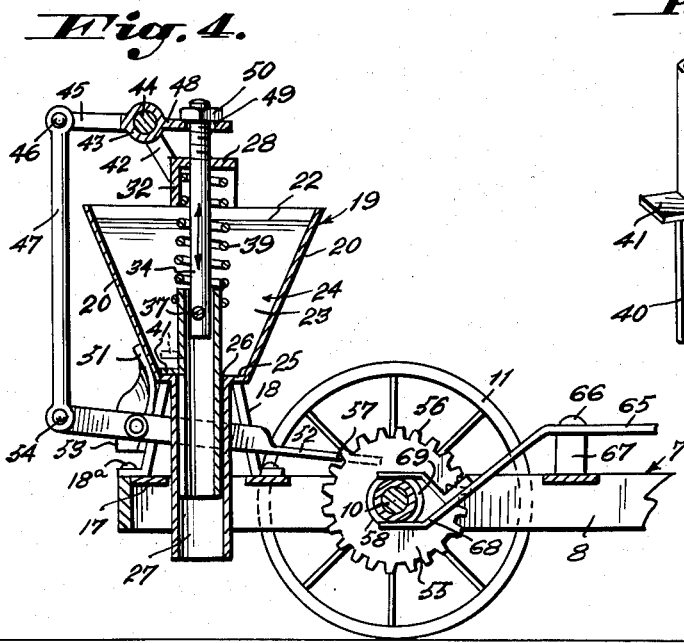
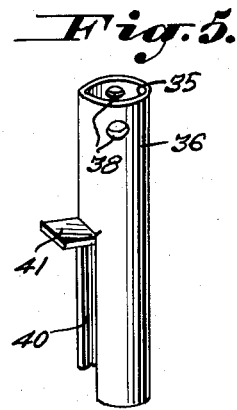

Patented Apr. 8, 1952

2,591,894

UNITED STATES PATENT OFFICE 2,591,894

INTERMITTENTLY ACTUATED DISTRIBUTOR DISPENSING VALVE

Edwin Voges, Ireland, Tex.

Application June 10, 1949, Serial No. 98,357

3 Claims. (Cl. 222—185)

This invention relates to a novel construction of farm implement and more particularly to a distributor primarily intended and adapted for use in distributing fertilizer but which may also be employed for distributing other substances at a predetermined and desired rate, depending upon the rate of travel of the device so that the material will be dispensed therefrom in adequate amounts to accomplish its intended result yet without waste or without distributing too much of the material in any particular location.

More particularly, it is an aim of the present invention to provide a trailer type wheeled distributor adapted to be attached to a tractor, drill, planter or other farm machine for propelling the distributor therebehind and which is actuated by power take-off means from one of the ground engaging wheels of the distributor for dispensing fertilizer or other material at a uniform rate and in ratio to the speed of travel of the distributor.

Still another object of the invention is to provide a novel distributor wherein the dispensing unit additionally functions as an agitating unit for agitating the material to be dispensed to further insure a uniform dispensing thereof.

Still another object of the invention is to provide a distributor of extremely simple construction which is capable of being economically manufactured and readily serviced and which will be extremely durable and efficient for accomplishing its intended purposes.

Another object of the invention is to provide a distributor having means for disengaging the dispensing and actuating unit when the distributor is backed or where it is desired not to utilize the distributor as in moving to and from a field to be fertilized.

Various other objects and advantages of the invention will hereinafter become more fully apparent from the following description of the drawings, illustrating a presently preferred embodiment thereof, and wherein:

Figure 3 is a cross sectional view thereof taken substantially along a plane as indicated by the line 3—3 of Figure 1;

Figure 4 is a longitudinal sectional view of the distributor taken substantially along a plane as indicated by the line 4—4 of Figure 2, and Figure 5 is a perspective view on an enlarged scale of one of the dispensing tubes, shown removed from the distributor.

Figure 1:
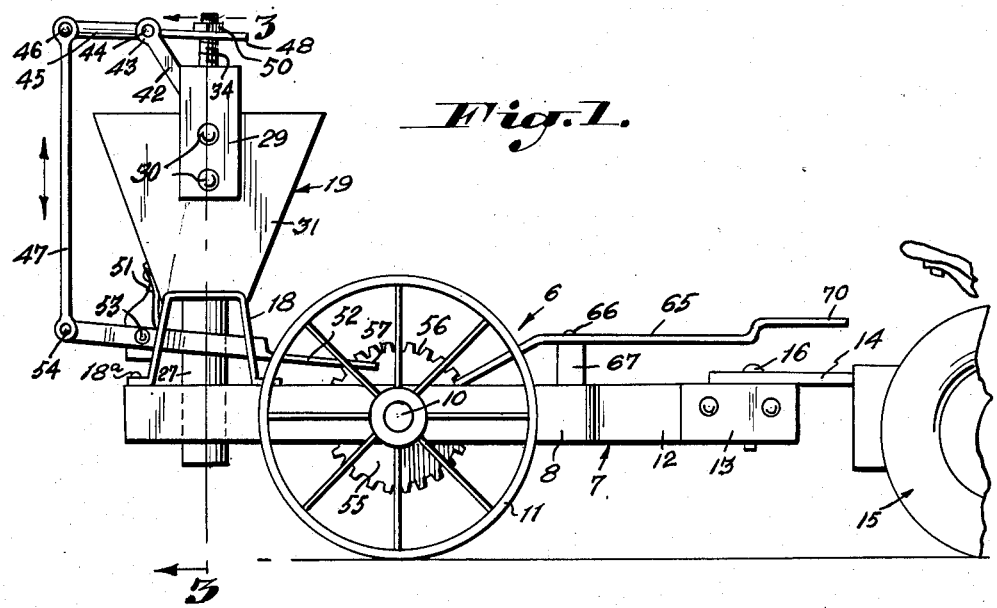
Figure 1 is a side elevational view showing the distributor attached to the drawbar of a tractor or other farm machine having a prime mover.

Referring more specifically to the drawings, the distributor in its entirety is designated generally 6 and comprises an open frame 7 having corresponding side members 8 which are provided with aligned bearings 9 for journaling an axle 10 on the ends of which are mounted ground engaging wheels 11 which provide the wheel support for the distributor 6. At least one of the wheels 11 is fixed to the axle 10 and as clearly illustrated in Figure 2, said wheels are located outwardly of the frame sides 8. The forward end 12 of the frame 7 is provided with a forwardly extending tongue or coupling portion 13 which is adapted to be detachably coupled to a rearwardly extending drawbar 14 of a prime mover such as a tractor, drill or planter, the rear portion of which is seen at 15 in Figure 1, by means of a coupling pin 16.

The frame 7, adjacent its rear end, is provided with a pair of spaced transversely extending braces or supports 17 on which a plurality of upwardly extending arch shaped brackets 18 are mounted and secured by fastenings 18a.

Figure 2:
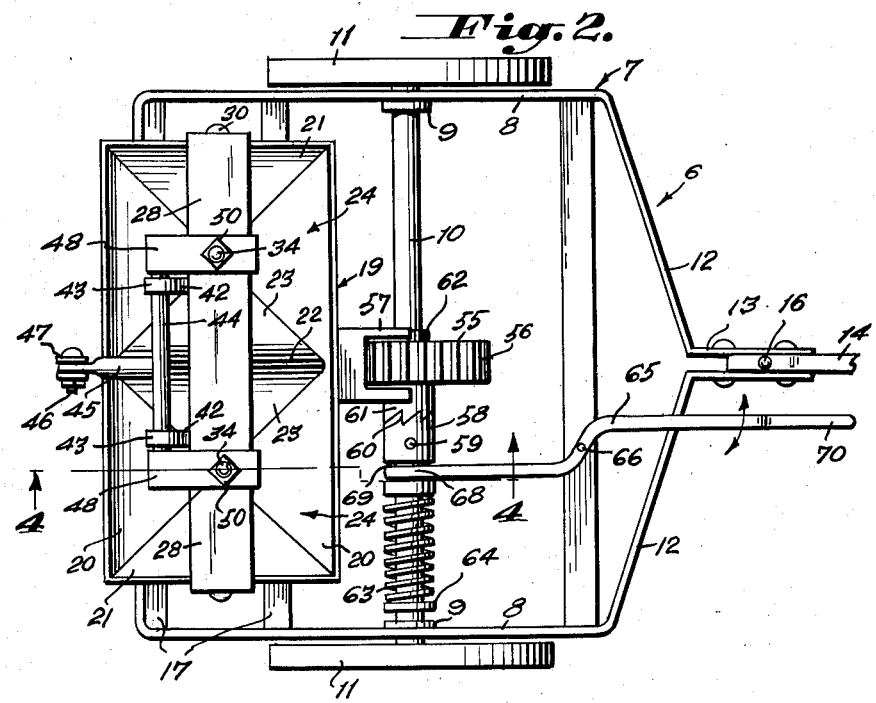
Figure 2 is a top plan view of the distributor.

An elongated trough, designated generally 19, is supported by the brackets 18 above the rear end of the frame 7 and transversely thereof and as clearly illustrated in Figure 2, the trough 19 is provided with downwardly converging side walls 20, downwardly converging end walls 21 and a transverse partition 22 having downwardly diverging opposite sides 23 which separates the trough 19 into corresponding hoppers 24 having corresponding downwardly converging side and end walls each formed by complementary portions of the side walls 20, an end wall 21 and one of the partition walls 23. Each hopper 24 is also provided with a bottom wall 25 having a relatively large opening therein as seen at 26, in Figure 4, and which is defined by the upper end of a discharge pipe 27 which is preferably formed integral with and depends from the bottom 25 downwardly through the frame 7 and between its supports 17 and which has its open lower end disposed to discharge downwardly at a point below the level of the frame 7.

A guide 28 is disposed above and longitudinally of the trough 19 and has depending end portions or legs 29 which are secured by fastenings 30 to end portions of an outer shell 31 of the trough 19 for supporting the guide 28 above the open top of said trough. The guide 28 is provided with a depending flange 32 which extends downwardly from its rear edge. The guide 28 is provided with an opening 33 disposed above and in alignment with each outlet pipe 27 through each of which extends a rod 34. The rods 34 are mounted for reciprocating movement in the guide openings 33 and have lower ends which extend downwardly into the hoppers 24 and through an opening 35 in the upper end of a dispensing tube 36, which openings 35 are sized to snugly receive the lower ends of the rods 34 and are of a diameter substantially less than the internal diameter of the remainder of the dispensing tube 36. It will thus be seen that one of the dispensing tubes 36 is associated with each hopper 24 and has its lower end extending downwardly into the discharge pipe 27 thereof and reciprocally disposed therein. A retaining pin 37 extends through diametrically aligned openings 38, near the upper end of each tube 36 and through the end of the rod 34 which is disposed therein, for detachably connecting the dispensing tubes to said rods. The end portions of the pins 37 which project outwardly from the tubes 36 also provide seats for a pair of expansion coil springs 39, one of which is disposed on each rod 34 with its lower end seating against the end of the pin 37 engaged thereby and with its upper end seating against the underside of the guide 28 for urging the rods 34 and dispensing tubes 36 downwardly relatively to the hoppers 24. The lower portion of each dispensing tube 36 is provided with a slot 40 partially formed by an outturned lip or flange 41 which functions as a stop for engaging the hopper bottom 25 for limiting the downward movement of its tube 36 and associated rod 34 under the biasing action of the spring 39, carried thereby and so that when the flange 41 is seated against the hopper bottom 25 the slot 40 will be closed or out of communication with the hopper 24 by engagement in the discharge pipe 27.

The guide 28 and its flange 32 support a plurality of upwardly and rearwardly extending arms 42 having aligned bearings 43 at their upper ends for journaling a shaft 44 which is provided intermediate of its ends with a rearwardly projecting lever 45 the free end of which is pivotally connected at 46 to the upper end of a connecting rod 47 which depends downwardly therefrom behind the trough 19. A relatively wide plate like lever 48 is fixed to and projects forwardly from each end of the shaft 44 over the guide 28 and is provided with a relatively large opening 49 therein for loosely receiving the upper end of one of the rods 34. The upper ends of the rods 34 are threaded to receive nuts 50 which are adjustably mounted thereon and bear on the upper sides of the plates or levers 48, so that when the shaft 44 is turned in a counterclockwise direction as seen in Figures 1 and 4 by a downward swinging movement of the lever 45, the levers 48 will be swung upwardly to exert an upward pull on the rods 34 and dispensing tubes 36 for elevating said rods and tubes relatively to the hoppers 24 and against the action of the springs 39 to expose portions of the slots 40 so that the fertilizer or other material, not shown, contained in the hoppers 24 may be dispensed through the thus exposed portions of said slots 40.

A hanger 51 is fixed to and depends from the rear portion of the trough 19 for supporting a lever 52, which is pivotally mounted adjacent its rear end thereon at 53. The lever 52 extends longitudinally of the frame 7 and is pivotally connected at its rear end at 54 to the lower end of the connecting rod 47 and has its forward end extending forwardly between the discharge pipes 27 to adjacent the axle 10. A disk or wheel 55 is rotatably mounted on the axle 10 and is provided with a transversely grooved periphery 56 forming spaced transversely extending lugs or projections. The forward end of the lever 52 is notched or bifurcated as seen at 57 to straddle the wheel 55 and the bight portion thereof is disposed to be engaged by the lugs or projections of the wheel periphery 56 so that when said wheel 55 is revolved in a clockwise direction as seen in Figures 1 and 4 the lever 52 will be rocked counterclockwise on its pivot 53 by engagement with the projections or lugs of the periphery 56 for exerting a downward pull on the connecting rod 47 as each of said lugs or projections ride under the forward end of the lever. As said forward end is released by each of said lugs or projections, the springs 39 will rock the parts 44, 45, 48 and 52 in the opposite or clockwise direction thereby exerting an upward pull on the connecting rod 47, so that whenever the wheel 55 is revolved clockwise as seen in Figures 1 and 4 the dispensing tubes 36 will be reciprocated relatively to the hoppers 24 to permit the contents of the hoppers to be intermittently dispensed through said tubes and the discharge pipes 27, and the flanges 41 of the tubes 36, in addition to functioning as stops will also function as agitator elements for the contents of the hoppers.

In order to prevent the wheel 55 from being rotated in the opposite direction, as when the distributor 6 is moved rearwardly or from right to left of Figures 1 and 2 and which would damage the lever 52, a clutch half 58 is slidably splined or keyed to the axle 10 by a key or pin 59 and has an inclined toothed inner end 60 for engagement with a complementary toothed end or clutch half 61, formed by an integral hub portion of the wheel 56, so that when the distributor 6 is moving forwardly or from left to right of Figures 1 and 2 and the clutch elements 60 and 61 are engaged, as seen in Figure 2, the wheel 55 will be revolved by the axle 10, which in turn is driven by one of the ground wheels 11, for actuating the dispensing tubes 36, as previously described. A collar 62 is preferably fixed to the axle 10 to engage the opposite side of the wheel 55 to prevent the wheel and its clutch half 61 from moving away from the clutch half 60. An expansion spring 63 is preferably mounted on the axle 10 to engage the opposite end of the clutch half 58 for urging it into engagement with the clutch half 61 and said spring 63 has its opposite end seating against a stop collar 64 which is likewise fixed to the axle 10. Due to the inclined arrangement of the clutch teeth, when the distributor 6 is backed, as previously described, the clutch half 58 will be cammed away from the clutch half 61 and against the action of the spring 63 so that the wheel 55 will not be rotated thereby. However, in order that the clutch halves may be positively disengaged and so that the distributor 6 can be rendered inoperative as in moving to and from a field or at other times when it is not desired to utilize the distributor, a lever 65 is pivotally mounted intermediate of its ends at 66 on a transverse brace member 67 of the frame 7 and has a fork shaped rear end 68 which loosely engages an annular groove 69 of the clutch half 58. The opposite, forward end of the lever 65 constitutes a handle 70 which is disposed conveniently to the operator of the prime mover 15 so that the lever 65 can be swung by its handle 70 counterclockwise, as seen in Figure 2, for disengaging the clutch halves and for retaining the clutch halves disengaged and so that the wheel 55 will not be revolved regardless of which direction the distributor 6 is moved.

Obviously, the distributor frame 7 can be made of any desired width and the trough 19 of any length and provided with any number of hoppers 24 and it will likewise be readily apparent that additional dispensing units could be connected to the shaft 44 by additional levers 48 so that the link and lever connection 47, 45, 52 could be utilized for simultaneously dispensing and agitating material in any number of hoppers. It will likewise be readily apparent that the distributor 6 may be employed for dispensing fertilizer or any other relatively finely divided material.

Various other modifications and changes are likewise contemplated, and may obviously be resorted to, without departing from the spirit or scope of the invention as hereinafter defined by the appended claims.

I claim as my invention:

1. The combination with a distributor of the character described including a frame, a hopper supported on said frame having a bottom provided with a depending discharge pipe, of a dispensing tube telescopically disposed in said discharge pipe and extending upwardly therefrom, said dispensing tube having at least one discharge opening connecting the hopper and its discharge pipe when the tube is in an elevated position and which is closed by the discharge pipe when the tube is in a lowered closed position, spring means urging said tube downwardly for closing the discharge opening thereof, a driven cam wheel rotatably mounted in the frame, and link and lever means connected to said dispensing tube and intermittently engaged and actuated by the cam wheel for raising the dispensing tube to expose the discharge opening thereof, said spring means returning the dispensing tube to a closed position when the link and lever means is released by the cam wheel.

2. The combination with a distributor including a frame, a hopper supported by the frame having a bottom provided with a downwardly extending downwardly opening discharge pipe, of a dispensing tube having an upper portion disposed in the hopper and a lower portion extending into and slidably engaging the discharge pipe and sized to fit relatively snug therein, said dispensing tube having an opening in its lower portion normally closed by engagement with the discharge pipe; spring means yieldably urging the discharge tube downwardly for closing the opening thereof, a driven cam wheel rotatably mounted in the frame, and link and lever means pivotally supported on the hopper intermittently actuated by the cam wheel and connected to said dispensing tube for elevating the tube against the action of said spring means to move the tube opening to an exposed position within the hopper, said tube being forcibly displaced downwardly by the spring means when the link and lever means is released by the cam wheel to return the tube opening to a closed position within the discharge pipe.

3. A device as in claim 2, said link and lever means comprising a lower lever pivotally supported intermediate of its ends beneath said hopper and having a bifurcated forward end straddling a portion of the cam wheel and being intermittently elevated thereby as the cam wheel is revolved in one direction to displace the opposite rear end of the lever downwardly, an upper lever pivotally mounted intermediate of its ends above the hopper, a rigid connecting rod connecting the rear end of the lower lever to a complementary rear end of the upper lever to cause the levers to rock in unison when the forward end of the lower lever is elevated by the cam wheel, a guide secured to the hopper and disposed thereabove and beneath the opposite forward end of the upper lever, a rod extending slidably through said guide having a lower end secured in the upper end of the dispensing tube, the forward end of the upper lever having an opening through which the upper end of the last mentioned rod loosely extends, and a stop adjustably secured on the upper end of the last mentioned rod and bearing against the upper side of the upper lever whereby the tube is elevated when the forward ends of the levers are swung upwardly.

EDWIN VOGES.

REFERENCES CITED

The following references are of record in the file of this patent:

UNITED STATES PATENTS

| Number | Name | Date |
|---|---|---|
| 374,453 | Corser | Dec. 6, 1887 |
| 719,905 | Tshooljian | Feb. 3, 1903 |
| 772,443 | Turner | Oct. 18, 1904 |
| 938,177 | Spies | Oct. 26, 1909 |
| 2,290,712 | Robinson | July 21, 1942 |
| 2,498,515 | Wagner | Feb. 21, 1950 |